(12) United States Patent
Chi et al.

(10) Patent No.: US 9,412,072 B2
(45) Date of Patent: Aug. 9, 2016

(54) SYSTEM AND METHOD FOR IMPROVING THE FLIGHT SAFETY

(71) Applicants: Air China Limited, Shunyi District, Beijing (CN); Institute of Policy and Management, Chinese Academy of Sciences, District, Beijing (CN)

(72) Inventors: Hong Chi, Beijing (CN); Baoguang Xu, Beijing (CN); Mingliang Qi, Beijing (CN); Ningning Zang, Beijing (CN); Xueyan Shao, Beijing (CN); Mingang Gao, Beijing (CN); Biao Shi, Beijing (CN); Xianchun Tan, Beijing (CN)

(73) Assignee: AIR CHINA LIMITED, Shunyi District, Beijing (CN)

( * ) Notice: Subject to any disclaimer, the term of this patent is extended or adjusted under 35 U.S.C. 154(b) by 359 days.

(21) Appl. No.: 14/174,113

(22) Filed: Feb. 6, 2014

(65) Prior Publication Data

US 2014/0250042 A1    Sep. 4, 2014

(30) Foreign Application Priority Data

Feb. 7, 2013    (CN) .......................... 2013 1 00499496

(51) Int. Cl.
*G06N 5/04*    (2006.01)
*G08G 5/00*    (2006.01)
*G06Q 30/02*    (2012.01)
*G06Q 50/30*    (2012.01)

(52) U.S. Cl.
CPC .............. *G06N 5/04* (2013.01); *G06Q 30/0201* (2013.01); *G06Q 50/30* (2013.01); *G08G 5/0039* (2013.01); *G08G 5/0043* (2013.01); *G08G 5/0056* (2013.01)

(58) Field of Classification Search
CPC ........................................................ G06N 3/04
USPC ............................................................. 706/46
See application file for complete search history.

(56) References Cited

U.S. PATENT DOCUMENTS

| | | | |
|---|---|---|---|
| 5,710,559 A * | 1/1998 | Krogmann | G05D 1/0055 340/439 |
| 6,538,581 B2 * | 3/2003 | Cowie | G08G 5/0086 340/961 |
| 6,937,924 B1 | 8/2005 | Statler | |
| 7,769,608 B1 | 8/2010 | Woll | |
| 8,024,111 B1 | 9/2011 | Meadows | |
| 8,289,187 B1 | 10/2012 | Kerr | |
| 2010/0145552 A1 | 6/2010 | Herman | |
| 2012/0166229 A1 | 6/2012 | Collins | |
| 2012/0271538 A1 | 10/2012 | Lee | |
| 2013/0030605 A1 | 1/2013 | Basir | |

OTHER PUBLICATIONS

Ning-ning, Z. "The Search Model on the High Requent Risk Subsets of the Division or Turning Back Flights," Operations Research and Management Science, vol. 21, No. 3, pp. 105-113 (Jun. 2012).
EP Search Report mailed Aug. 6, 2014.

* cited by examiner

*Primary Examiner* — Stanley K Hill
*Assistant Examiner* — Ola Olude Afolabi
(74) *Attorney, Agent, or Firm* — Brundidge & Stanger, P.C.

(57) ABSTRACT

The present invention relates to a system for improving the flight safety, comprising: a prediction component which predicts behaviors of an aircraft; and an indication component which indicates adjustment of an operation of the aircraft to reduce the possibility of occurrence of abnormal flying behaviors.

24 Claims, 7 Drawing Sheets

SYSTEM AND METHOD FOR IMPROVING THE FLIGHT SAFETY

FIELD OF THE INVENTION

The present invention relates to an aircraft-related technology, and in particular to a system and method for improving the flight safety by predicting behaviors of an aircraft.

BACKGROUND

During the operation of an aircraft, flight safety must be guaranteed. When some events that may impact the flight safety occur, it is necessary to adjust normal flying behaviors of the aircraft so as to ensure flight safety, which results in abnormal flying behaviors. Abnormal flying behaviors of an aircraft comprise cancellation of flight, change of route, flight delay, flight turning back and diversion etc. Those behaviors reflect potential risks on flight reliability and safety and tremendously lessen the comfort level and satisfaction of the passengers on board. All airline companies have been trying every effort to study abnormal behaviors of aircrafts, hoping to find a way to reduce those behaviors as much as possible. Consequently, the prediction of abnormal behaviors of aircrafts for improving the flight safety and comfort has become an important research direction of every airline company. However, this technical problem has being haunting all airline companies for years, never being resolved.

SUMMARY

For one or more technical problems of the prior art, one aspect of the invention provides a system for improving the flight safety, comprising: a prediction component which predicts behaviors of an aircraft; and an indication component which indicates adjustment of an operation of the aircraft to reduce the possibility of occurrence of abnormal flying behaviors.

The system as above, wherein the prediction module comprises: model generation unit which constructs a data space based on two or more data dimensions of flying behaviors and generates a prediction model of flying behaviors according to searching conditions and constraint conditions; data acquisition unit which acquires data of flying behaviors; and prediction unit which searches high percentage regions of abnormal flying behaviors on the data space by using the prediction model of flying behaviors according to the data of flying behaviors.

The one or more systems as above further comprises a database, wherein the prediction unit acquires data of flying behaviors from the data acquisition unit or the database.

The one or more systems as above wherein the search of the prediction unit is performed in the region ready for search which is a part of the data space.

The one or more systems as above wherein the searching conditions of the model generation unit are: the higher the percentage of abnormal flying behaviors of the high percentage region is, the better, approaching 1 as much as possible; the bigger the area of the high percentage region is, the better, approaching the entire region ready for search as much as possible; and the number of flights having abnormal behaviors contained in the high percentage region is as much as possible.

The one or more systems as above wherein the constraint condition of the model generation unit is: the number of flights having abnormal behaviors and/or total number of flights in the high percentage region exceeds a preset threshold.

The one or more systems as above wherein the constraint condition of the model generation unit further comprises: the percentage of abnormal flying behaviors in the high percentage region exceeds another threshold.

The one or more systems as above wherein the data acquisition unit determines the data of the data dimensions through adjustment by using the raw data of flying behaviors.

The one or more systems as above wherein the prediction unit further comprises: searching module, traversing the region ready for search; constraint solving module, judging whether the traversal results meet the constraint conditions; and storing and ranking module, storing all traversal results which meet the conditions, and ranking on an overall basis, and outputting high percentage regions of abnormal flying time according to the overall ranking result.

The one or more systems as above wherein the searching unit searches the region ready for search on the entire data space.

The one or more systems as above wherein the searching unit searches the block whose percentage of abnormal flying behaviors exceeds the first threshold, and marks the connected blocks.

The one or more systems as above wherein the searching unit further searches the region formed by blocks whose percentage of abnormal flying behaviors exceeds the first threshold.

The one or more systems as above wherein the constraint solving module solves the searching conditions for the traversal results of each region, ranks single goal value and selects the minimum value as the optimal value of the region.

The one or more systems as above wherein the constraint solving module judges the traversal with minimum value according to the constraint conditions.

The one or more systems as above wherein the constraint solving module judges the traversal with minimum value according to the constraint conditions.

The one or more systems as above wherein the storing and ranking module calculates and ranks the value of each searching condition for all regions traversed.

The one or more systems as above wherein the storing and ranking module calculates the overall rank of all traversed blocks according to the value of each searching condition of all regions traversed.

According to another aspect of the present invention, it provides a method of improving of the flight safety, comprising: predicting behaviors of an aircraft; and indicating adjustment of an operation of the aircraft to reduce possibility of occurrence of abnormal flying behaviors.

The method as above wherein predicting behaviors of an aircraft comprising: constructing a data space based on two or more data dimensions of flying behaviors and generating a prediction model of flying behaviors according to the searching conditions and constraint conditions; acquiring data of flying behaviors; and Searching high percentage regions of abnormal flying behaviors on the data space by using the prediction model of flying behaviors according to the data of flying behaviors.

The one or more methods as above wherein the searching is performed in the region ready for search which is a part of the data space.

The one or more methods as above wherein the searching conditions are: the higher the percentage of abnormal flying behaviors in the high percentage region is, the better, approaching 1 as much as possible; the bigger the area of the high percentage region is, the better, approaching the entire region ready for search as much as possible; and the number of flights having abnormal flying behaviors contained in the high percentage region is as much as possible.

The one or more methods as above wherein the constraint condition is: the number of flights having abnormal behaviors and/or the total number of flights in the high percentage region exceeds a preset threshold.

The one or more methods as above wherein the constraint condition further comprises: the percentage of abnormal flying behaviors in the high percentage region exceeds another threshold.

The one or more methods as above further comprises determining the data of the data dimensions through adjustment by using the raw data of flying behaviors.

The one or more methods as above further comprises: traversing the region ready for search; judging whether the traversal results meet the constraint condition; and storing all traversal results which meet the conditions and ranking on an overall basis; and then outputting high percentage regions with abnormal flying time according to the overall ranking results.

The one or more methods as above further comprises searching the region ready for search in the entire data space.

The one or more methods as above further comprises searching the block whose percentage of abnormal flying behaviors exceeds the first threshold and marking the connected blocks.

The one or more methods as above further comprises searching the region formed by blocks whose percentage of abnormal flying behaviors exceeds the first threshold.

The one or more methods as above further comprises solving the searching condition for the traversal results of each region, ranking single goal value, and selecting the traversal with minimum value as the optimal value of the region.

The one or more methods as above further comprises judging the traversal with minimum value according to the constraint conditions.

The one or more methods as above further comprises judging the traversal with minimum value according to the constraint conditions.

The one or more methods as above further comprises calculating and ranking the value of each searching condition of all regions traversed.

The one or more methods as above further comprises calculating the overall rank of all the blocks traversed according to the value of each searching condition of all regions traversed.

BRIEF DESCRIPTION OF THE DRAWINGS

Hereinafter, the preferred embodiments of the present invention will now be further described with reference to the accompanying drawings in which.

DETAILED DESCRIPTION

In order to present the goals, technical solutions and merits of embodiments of the present invention in a clearer manner, the technical solutions contained in the embodiments of the present invention will be fully described below with reference to the drawings in the embodiments of the present invention. Apparently, what is described hereafter is only a part of the present invention rather than all of the embodiments. Based on the embodiments of the present invention, all other embodiments persons skilled in the art achieve without paying any creative effort shall fall within the protection scope of the present invention.

Generally speaking, factors that cause abnormal flying behaviors of an aircraft may fall into two aspects. One aspect are the factors relating to the aircraft itself, such as maintenance, oil refueling, flight malfunction and the like; the other are the factors outside of the aircraft, such as the weather, site condition and so on.

Abnormal flying behaviors caused by factors relating to the aircraft itself can be reduced by improving the maintenance of the aircraft. As for the abnormal flying behaviors caused by factors outside of the aircraft, there is a certain objective rule. Such abnormal flying behaviors of the aircraft can be predicted in a reasonable manner by using data mining technology to analyze historical data of the abnormal flying behaviors caused by factors outside of the aircraft and construct a suitable mathematical model.

The present invention mainly focuses on the abnormal flying behaviors caused by factors outside of the aircraft. As what has been mentioned in the Background, the abnormal flying behaviors comprise and are not limited to the cancel of flight, change of route, delay, flight turning back and diversion. The abnormal flying behaviors reflect the potential risks which cause adjustment of the aircraft's normal flying behaviors. Therefore, the safety of the flight can be improved by predicting the abnormal flying behaviors and adjusting the operations of the aircraft such that the possibility of occurrence of abnormal flying behavior is reduced.

If the flight of an aircraft appears in high percentage regions, then according to prediction, there is a distinct possibility that abnormal behaviors will occur. Then, one can consider rescheduling the flight into non-high percentage regions. In other words, according to the prediction of the present invention, the flight should be scheduled such that it can avoid high percentage regions of abnormal flying behaviors as much as possible, and thus the flight safety of the aircraft can be guaranteed and the comfort level of the passengers on board can be improved.

The technical solutions of the present invention are further described below by taking the turning back and diversion of aircraft as an example. Other abnormal flying behaviors can also be predicted through a way similar to the embodiment of the turning back and diversion of the aircraft.

Figure 1:
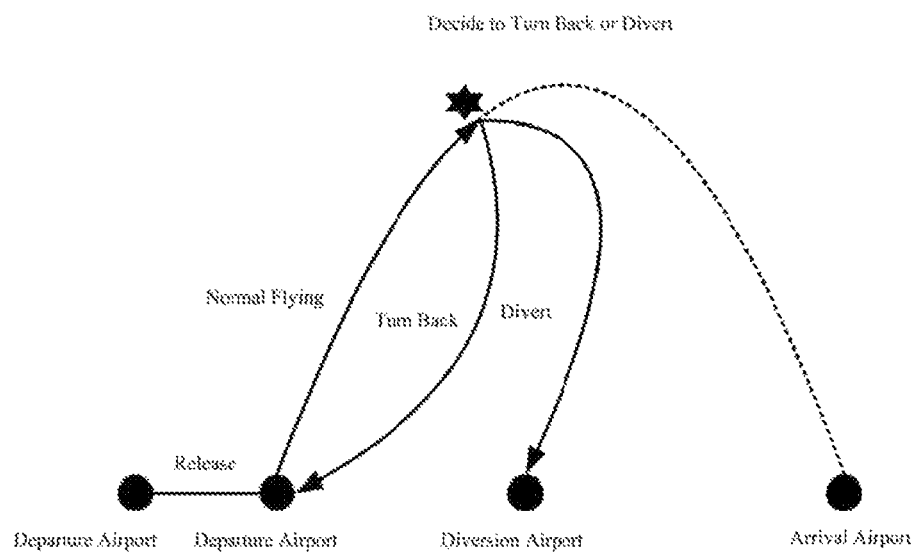
FIG. 1 is a schematic diagram of an example of the turning back and diverting process of an aircraft.

FIG. 1 is a schematic diagram illustrating an example of the turning back and diversion of an aircraft. As shown in FIG. 1, the aircraft takes off smoothly at the departure airport. During the normal flying process, it occurs that the aircraft has to turn back or divert. The decision to turn back or divert has been made at a certain location (marked by "*" as shown in the figure). After that, the aircraft turns back to the departure airport or diverts to the diversion airport rather than flying to the arrival airport along the airline marked by dash line. The turning back and diversion shown in FIG. 1 are abnormal flying behaviors discussed in the present invention.

For a certain arrival airport, the site condition is fixed. Therefore, all situations having turning back and diversion relating to the arrival airport can be gathered and considered as an independent data space. The prediction of turning back and diversion of an aircraft can thus be achieved through the assessment of the probability of the occurrence of turning back and diversion in a certain condition.

Figure 2:
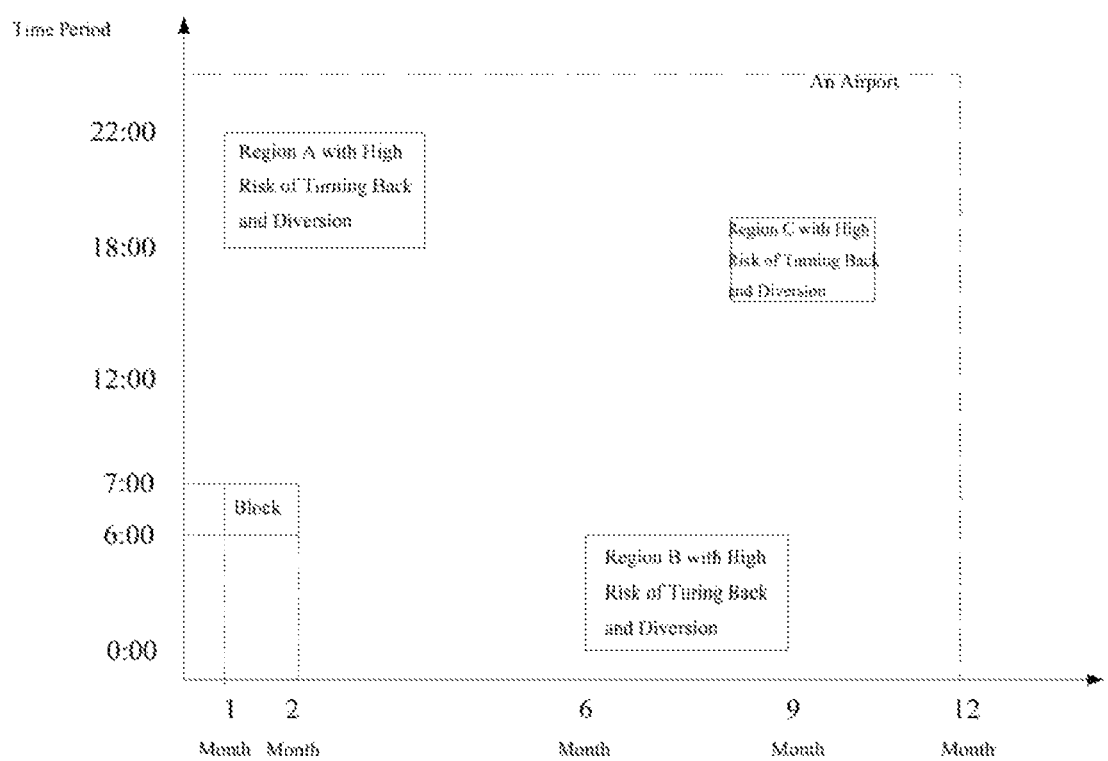
FIG. 2 is a schematic diagram illustrating the predication of turning back and diversion of an aircraft according to one embodiment of the present invention.

FIG. 2 is a schematic diagram illustrating the predication of the turning back and diversion of an aircraft according to one embodiment of the present invention. As shown in FIG. 2, since the Month and the Time Period are discrete, they can form a two-dimensional plane. The 12 months in a year and the 24 hours of one day divide the two-dimensional plane into 288 rectangles with each small rectangle defined as a "block". The consecutive time periods of certain months or the consecutive months of certain time periods is defined as a "region". The bigger rectangle formed by two or more consecutive blocks is region. FIG. 2 shows the block formed by the time from January to February and between 6:00 and 7:00.

According to historical data of the flight, the landing times of all flights including the normal flights and the turning back and diverting flights fall within the 288 rectangles. For each block, the percentage of turning back and diversion in the block is the ratio between the number of turning back and diverting flights and the total number of flights in the block, namely:

Percentage of Turning Back and Diversion=Number of Turning Back and Diverting Flights/Total Number of Flights Similarly, for each region, its percentage of turning back and diversion is the ratio between the number of turning back and diverting flights and the total number of flights in the region. The percentage varies from block to block. Therefore, the percentage also varies from region to region. And thus, the regions having higher percentage of turning back and diversion can been located on the two-dimensional plane through algorithmic model.

A region can be regarded as a high percentage region when its percentage of turning back and diversion exceeds a certain threshold and is higher than any other neighboring regions. The threshold can be set according to practical situations such as the average percentage of turning back and diversion. Different threshold may result in different high percentage regions of turning back and diversion. For example, the arrival airport shown in FIG. 2 has three high percentage regions of turning back and diversion A, B and C which correspond to different month and time period. If the scheduled landing time of an aircraft falls right within a high percentage region of turning back and diversion, then it can be predicted that the ratio of the occurrence of turning back and diversion will be relatively high. Through the above method, the predication of turning back and diversion of an aircraft can be transferred into the search of regions meeting certain requirements in the above two-dimensional space.

It is difficult to construct an appropriate two-dimensional or multi-dimensional data space. An inappropriate data space will render the occurrence of certain abnormal flying behaviors of an aircraft discrete instead of centralized. Consequently, satisfying prediction result cannot be obtained. According to one embodiment of the present invention, optional data dimensions comprise: the landing time period, date, month, date or month of the lunar calendar, the time before or after certain events like solar terms, rainstorm, gale, snowfall and son on. The embodiment illustrated in FIG. 2 is an example of a two-dimensional plane space. It is also feasible to use a multi-dimensional space.

According to one embodiment of the present invention, the above search can be performed in a part of the data space, for example in region Z, rather than the entire data space. The most appropriate high percentage region can be located according to a series of searching conditions. For example, the following searching conditions can be adopted:

1. The higher the percentage of turning back and diversion in the region is, the better, approaching 1 as much as possible;
2. The larger the area of the region is, the better, approaching the entire region Z as much as possible;
3. The number of turning back and diverting flights contained in the region is as much as possible.

According to one embodiment of the present invention, the constraint condition for the above search can be that the number of turning back and diverting flights or the total number of flights in the region reaches a certain amount. Then, the searching issue can be transferred into the issue of multi-objective programming. The constraint condition can be:

4. The number of turning back and diverting flights and/or total number of flights in the region reaches a certain amount.

Figure 3:
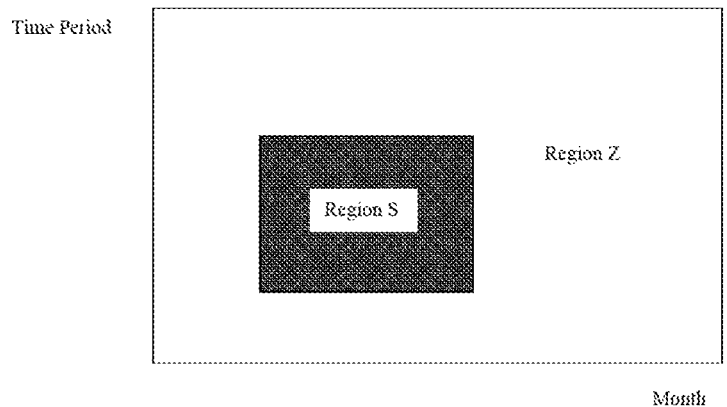
FIG. 3 is a schematic diagram of the searching targets according to one embodiment of the present invention
Figure 4:
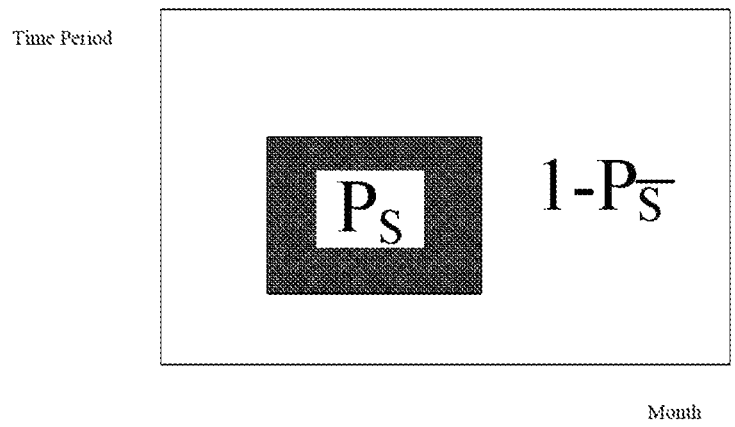
FIG. 4 is a schematic diagram of the first searching target according to the embodiment of FIG. 3.
Figure 5:
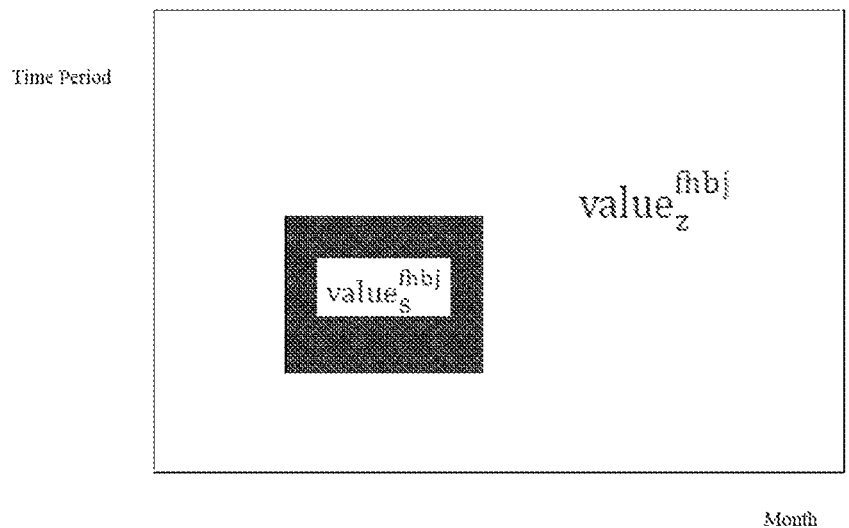
FIG. 5 is a schematic diagram of the second searching target according to the embodiment of FIG. 3.
Figure 6:
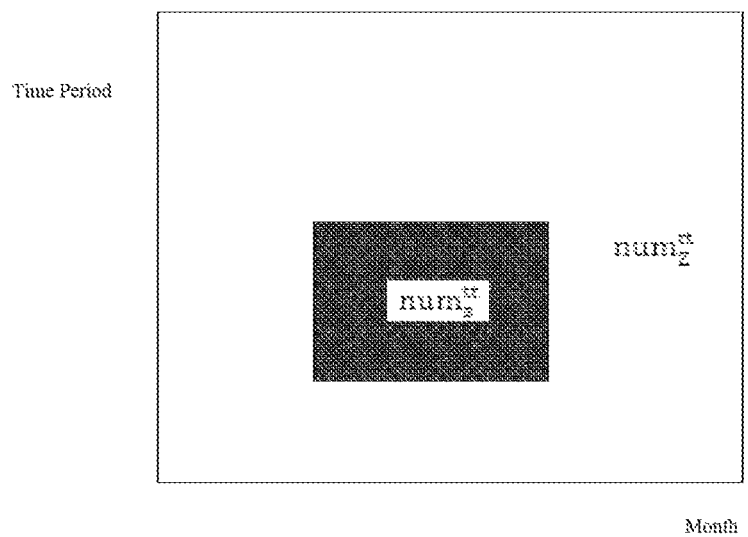
FIG. 6 is a schematic diagram of the third searching target according to the embodiment of FIG. 3.

FIG. 3 is a schematic diagram illustrating the searching goals according to one embodiment of the present invention, namely, to search the region S which meets the searching conditions and constraint condition in region Z. FIG. 4 is a schematic diagram of the first searching goal according to the embodiment of FIG. 3; FIG. 5 is a schematic diagram of the second searching goal according to the embodiment of FIG. 3; FIG. 6 is a schematic diagram of the third searching goal according to the embodiment of FIG. 3. As shown in FIG. 3-FIG. 6, the present embodiment uses the same time period and month with that in the embodiment of FIG. 2 as the dimensions of the two-dimensional plane. The three searching goals correspond to the above three searching conditions.

The following are the specific search expressions:

(1) Setting variables of region Z 1.1. The region where turning back and diversion occur frequently is Z 1.2. The number of basic blocks contained in region Z is $num_Z^{tt}$ 1.3. The number of turning back and diverting flights existing in region Z is $value_Z^{fhbj}$ 1.4. The number of flights in region Z is $value_Z^{tt}$ 1.5. The starting month on the month dimension of region Z is $SM_Z$ 1.6. The ending month on the month dimension of region Z is $EM_Z$ 1.7. The starting time period on the time period dimension of region Z is $ST_Z$ 1.8. The ending time period on the time period dimension of region Z is $ET_Z$ According to the above, the area of region Z can be denoted by:

$$Z_{square} = (EM_Z - SM_Z + 1) * (ET_Z - ST_Z + 1)$$

(2) Setting variables of region S
1.1. The searching region is $S_{sin\_em\_st\_et}$
1.2. The percentage of turning back and diversion of region $S_{sin\_em\_st\_et}$ is $p_S$
1.3. The number of basic blocks having turning back and diverting flights in region $S_{sm\_em\_st\_et}$ $num_S^{fubj}$
1.4. The number of basic blocks contained in region $S_{sm\_em\_st\_et}$ is $num_S^{tt}$
1.5. The number of turning back and diverting flights in region $S_{sm\_em\_st\_et}$ is $value_S^{fhbj}$
1.6. The number of flights contained in region $S_{sm\_em\_st\_et}$ is $value_S^{tt}$
1.7. The starting month on the month dimension of region $S_{sm\_em\_st\_et}$ is $SM_S$
1.8. The ending month on the month dimension of region $S_{sm\_em\_st\_et}$ is $EM_S$
Written Description
1.9. The starting time period on the time period dimension of region $S_{sm\_em\_st\_et}$ is $ST_S$
1.10. The ending time period on the time period dimension of region $S_{sm\_em\_st\_et}$ is $ET_S$
According to the above, the area of region S can be denoted by:

$$S_{square}=(EM_S-SM_S+1)*(ET_S-ST_S+1)$$

(3) Setting variables of region
1.1. The rest region after the removal of region $S_{sm\_em\_st\_et}$ from region Z is marked as $\overline{S}$
1.2. The percentage of turning back and diversion of region $\overline{S}$ is $p_{\overline{S}}$
1.3. The number of basic blocks contained in region $\overline{S}$ is $num_{\overline{S}}^{tt}$
1.4. The number of turning back and diverting flights in region $\overline{S}$ is $value_{\overline{S}}^{fhbj}$
1.5. The number of flights contained in region $\overline{S}$ is $value_{\overline{S}}^{tt}$
1.6. The area of region $\overline{S}$ is $\overline{S}_{square}=Z_{square}-S_{square}$ (4) Decision variables
Decision variables, that is, the point of tangency and step size of the searching variables on the time period and month dimensions:
1.1. The starting month of a block on the month dimension is sm
1.2. The ending month of a block on the month dimension is em
1.3. The starting time period of a block on the time period dimension is st
1.4. The ending time period of a block on the time period dimension is et (5) Objective function
Goal 1: The percentage of turning back and diversion in the rectangular region approaches 1 as much as possible, which can be denoted by:

$$\max\ goal1=p_S+(1-p_{\overline{S}})$$

Goal 2: The higher the ratio between the number of turning back and diverting flights contained in this region and the number of turning back and diverting flights in region Z is, the better, which can be denoted by:

$$\max\ goal2=value_S^{fhbj}/value_Z^{fhbj}$$

Goal 3: The rectangular region approaches the entire region Z as much as possible. That is to say, the number of basic blocks contained covers the number of blocks in the entire region Z as much as possible, which can be denoted by:

$$\max\ goal3=num_S^{tt}/num_Z^{tt}$$

(6) Constraint conditions
Constraint condition 1: The number of turning back and diverting flights in region S reaches a certain amount; the formula is:

$$value_S^{phbj} \geq S_{square}*av_{phbj}$$

$av_{fhbj}$=$value_{phbj}$/number of blocks having turning back and diverting flights
Constraint condition 2: the total number of flights in region S reaches a certain amount; the formula is $$value_S^{tt} \geq S_{square}*av_{tt}$$

$av_{tt}$=value/number of blocks having flights
Constraint condition 3: the percentage of turning back and diverting flights in region S must reach a certain level; the formula is:

$$value_S^{fhbj}/value_S^{tt} \geq P_{level}$$

Setting Other Variables
P1, P2, P3 are the priority orders of goal1, goal2, goal3 respectively. The larger the value is, the higher the priority order is.
And thus, after overall optimization, the mathematical optimization model of the search can be denoted by:

$$\begin{cases} \max\quad goal1 = P_S + (1 - P_{\overline{S}}) \\ \max\quad goal2 = num_S^{tt}/num_Z^{tt} \\ \max\quad goal3 = value_S^{fhbj}/value_Z^{fhbj} \\ value_S^{fhbj} \geq S_{square}*av_{fhbj}\ or\ value_S^{tt} \geq S_{square}*av_{tt} \\ value_S^{fhbj}/value_S^{tt} \geq P_{level} \end{cases}$$

Wherein, the decision variables are: stn,em,st,et which decides the $S_{sm\_em\_st\_et}$.

Figure 7:
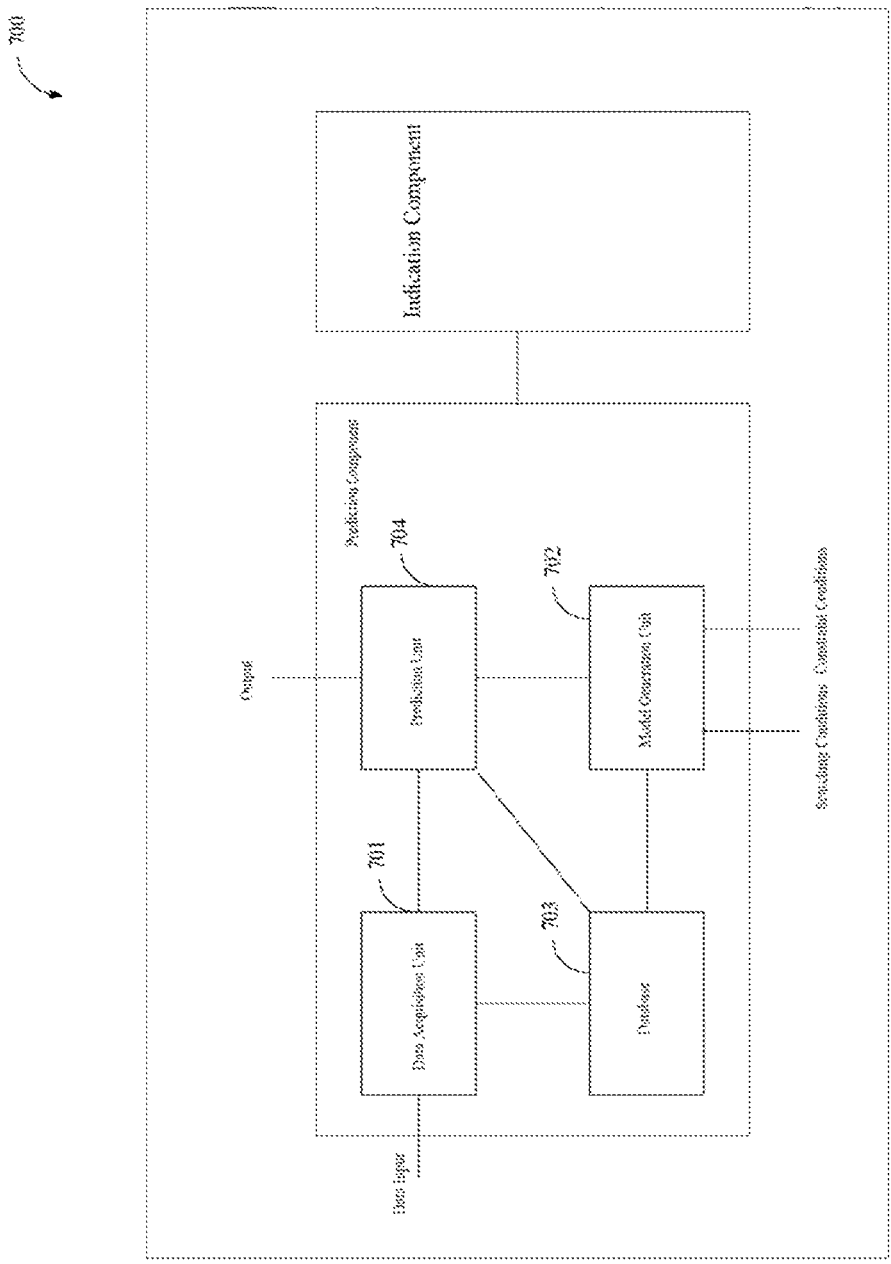
FIG. 7 is a schematic diagram of the system for improving the flight safety according to embodiments of the present invention.

FIG. 7 is a structural schematic diagram illustrating the system for improving the flight safety according to embodiments of the present invention. As shown in FIG. 7, The system 700 comprises an prediction component for predicting behaviors of an aircraft and an indication component for indicate adjustment of operations of the aircraft so that the possibility of occurrence of the abnormal flying behaviors is reduced. According to one embodiment of the present invention, the indication component comprises an adjustment unit which presents, suggests, or implies changes of the operations of the aircraft to avoid regions with high possibility of abnormal flying behaviors, for example, changes of timing, location, etc.; and an output unit, such as a screen or a message transmission module, which presents or transmit the changes of the operations of the aircraft. According to another embodiment of the present invention, the indication component highlights the regions of high possibility of abnormal flying behaviors for reference to the operators or instructors of the aircraft.

According to FIG. 7, the prediction component for behaviors of an aircraft comprises: data acquisition unit 701, model generation unit 702, database 703 and prediction unit 704.

Data acquisition unit 701 is used for directly acquiring data of the dimensions needed from the raw data; or determining the data of the dimensions needed through adjustment of the raw data. The following is a description of the data acquisition process by taking the acquisition of data of turning back and diversion as an example.

Extracting fields from flight record, wherein "FLT-ID" is flight number; "DEP_APT" is departure airport; "ARR_APT" is arrival airport; "STD" is scheduled time of departure; "STA" is scheduled time of arrival; "OFF_TIME"

is the actual take-off time; "ON_TIME" is the actual landing time; "CANCEL_FLAG" is flight status; "MEMO" is memorandum of flight status.

Generally, when the value of the field "CANCEL_FLAG" is "0", it means normal; when the value is "1", it means cancellation; when the value is "3", it means the diversion process of an diverting flight; when the value is "4", it means the re-flying process of an diverting flight; when the value is "5", it means the turning back process of an turning back flight; when the value is "6", it means the re-flying process of an flight. As need, the record where the value of the field "CANCEL-FLAG" is "1" is deleted.

According to one embodiment of the present invention, for the record where the value of the field "CANCEL_FLAG" is "3" or "5", the field "MEMO" is acquired and matched and the record where the field "MEMO" comprises "Rain", "Snow", "Wind", "Fog", "Cloud", "Ice", "Visibility" or "Weather" is kept.

According to one embodiment of the present invention, for the field where the value of field "CANCEL_FLAG" is "3" or "5", the field "ON_TIME" is adjusted. ON_TIME=OFF_TIME+(STA-STD). The value of the field "CANCEL-FLAG", which is "4" or "6", is adjusted into "0".

The field ON_TIME goes through the following processing: the time field ON-TIME is split with the fields "ON-Y", "ON_M", "ON-D", "ON_T" representing the Year, Month, Date, Time(Moment) respectively. For example, if ON_TIME is "2009-10-1 6:05", then ON_Y=2009, ON_M=10, ON_D=1, ON_T=6.

For the field "ARR_APT", the arrival airport of normal flights within a certain time period is used to adjust the arrival airport recorded by turning back and diverting flights within this time period.

Specifically, the field "ARR_APT" recorded when the value of the field "CANCEL_FLAG" is "3" or "5" is adjusted as follows:

1. The fields "FLT_ID"-flight number, "DEP_APT"-arrival airport and "ON_Y" recorded when the value of "CANCEL_FLAG" is "3" or "5" are extracted and recorded as FLT_ID_FHBJ, DEP-APT, ON_Y_FHBJ, ON_M_FHBJ;
2. The field "ARR_APT" recorded when the value of "CANCEL_FLAG" is "0", the value of "FLT_ID" is FLT_ID_FHBJ, the value of "DEP_APT" is DEP_APT and the value of "ON_Y" is ON_Y_FHBJ is extracted and recorded as AP.
3. The content of the field "ARR-APT" recorded above is adjusted by using AP.

After the above process, data can be extracted from the arrival airport data. Among them, the record where CANCEL_FLAG=0 is the record of normal flight; the record where CANCEL_FLAG=3 or 5 is the record of turning back and diverting flights. The addition of the above is the record of all flights analyzed. The data of the arrival airport in each record is extracted and analyzed.

After data acquisition unit 701 acquired data, the data is transmitted to and stored in database 703 or directly transmitted to prediction unit 704 for processing.

Database 703 is used for storing historical data of the flight, receiving enquiry from prediction unit 704 and providing corresponding data for prediction unit 704 to use. According to one embodiment of the present invention, the database 703 can, based on the model generated in model generation unit 702, adjust the format of the historical data stored in the database or generate new data sheet for use.

According to one embodiment of the present invention, all turning back and diverting flights goes through preliminary statistics. The distributions of total number of flights, total number of turning back and diverting flights and percentage of turning back and diversion falling on the three dimensions—arrival airport, actual landing month and actual landing time period—are established and recorded as follows:

1. The total number of flights falling on the three dimensions—arrival airport, month and time period: tt(ap,mon,time)
2. The total number of turning back and diverting flights falling on the three dimensions—arrival airport, month and time period: fhbj(ap,mon,tim)
3. The percentage of turning back and diversion falling on the three dimensions—arrival airport, month and time period: p(ap,mon,tim)

Wherein, ap is the serial number of the arrival airport; mon is the month whose value is mon=1,2,3,4,5,6,7,8,9,10,11,12; tim is the time period and tim=1,2,3,4, . . . , 22,23.

Model generation unit 702 generates searching models corresponding to the input searching conditions and constraint conditions. The function of model generation unit 702 has been described previously in details and thus is not stated repeatedly here.

Prediction unit 704, according to models of the model generation unit 702, acquires corresponding data from the database, searches high percentage regions of certain abnormal flying behaviors, and thus realizes the prediction of certain abnormal flying behaviors. Persons skilled in the art should appreciate that the models generated by model generation unit 702 can also be preserved in the database or the storage of the system for predicting flight behaviors. Therefore, it is not necessary for prediction unit 704 to regenerate models by using the model generation unit for each prediction.

The "unit" mentioned herein can be a circuit that performs certain function. Therefore, the term "unit" can also be replaced by "circuit". According to one embodiment of the present invention, those circuits comprises but are not limited to processor, digital signal processor (DSP), general microprocessor, application specific integrated circuit (ASIC), field programmable gate array (FPGA) or other equivalent integrated circuits or discrete logic circuits.

Figure 8:
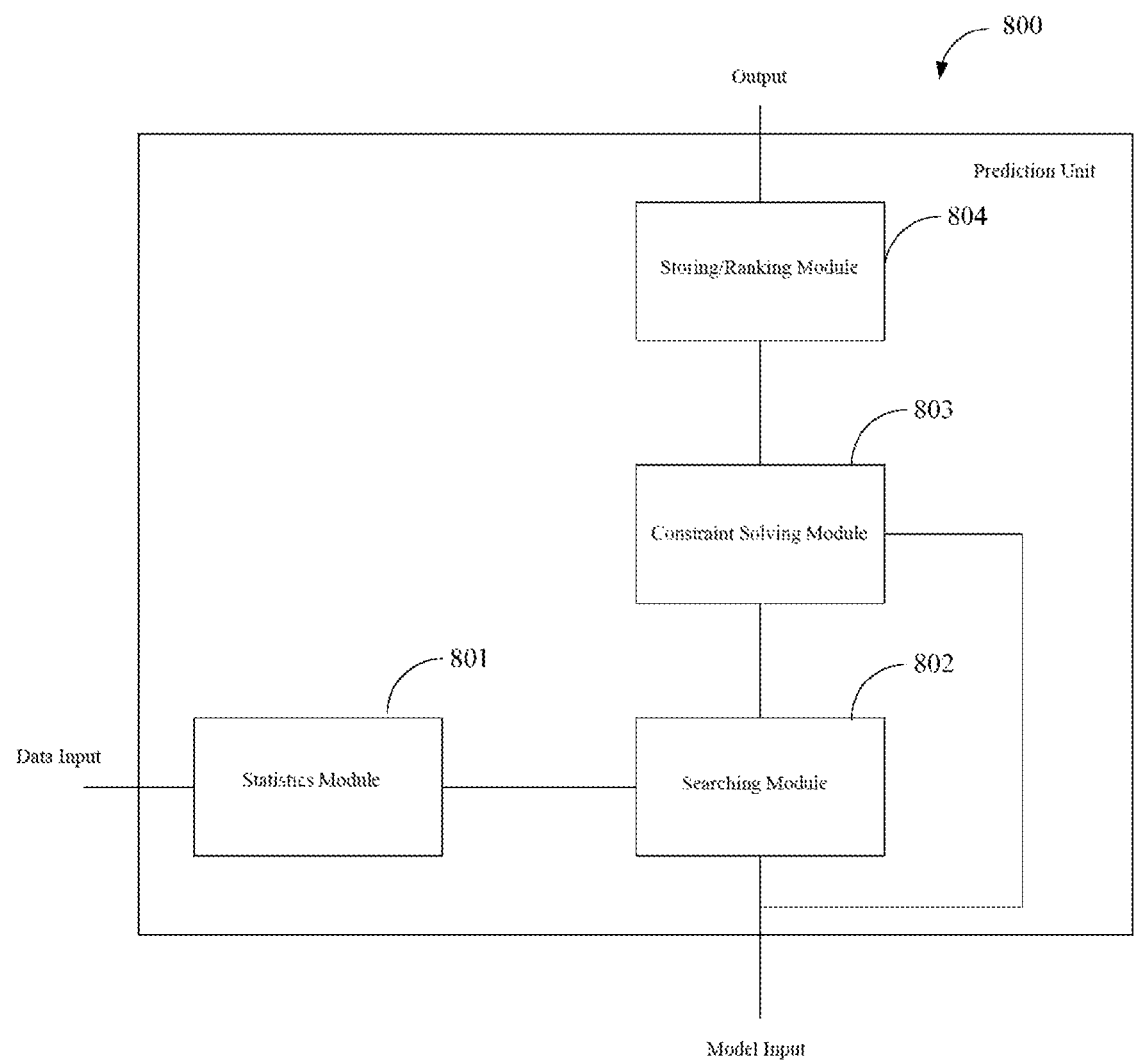
FIG. 8 is a schematic diagram of the prediction unit according to one embodiment of the present invention.

FIG. 8 is a schematic diagram of the prediction unit according to one embodiment of the present invention. The embodiment as shown in FIG. 8 can be applied to the prediction unit 704 in the embodiment of FIG. 7. As shown in FIG. 8, prediction unit 800 comprises statistics module 801, searching module 802, constraint solving module 803 and storing and ranking module 804.

Statistics module 801 is used to perform the statistics function, for instance, the statistics of overall month distribution of turning back and diverting flights or the statistics of month distribution of turning back and diverting flights of an arrival airport.

According to one embodiment of the present invention, the statistics of overall month distribution of turning back and diverting flights can comprise the following steps:

Step 1: setting the year which can be one year or consecutive years;

Step 2: When the value of month mon is 1,2,3,4,5,6,7,8,9,10,11,12, according to fhbj(ap,mon,tim) the distribution of turning back and diversion on the three dimensionsarrival airport, month and time period, the number of turning back and diverting flights in each month is calculated and recorded as value_fhbj(mon);

Step 3: when the value of month mon is 1,2,3,4,5,6,7,8,9, 10,11,12, according to tt(ap,mon,tim) the distribution of flights on the three dimensionsarrival airport, month and time period, the number of flights in each month is calculated and recorded as value_tt(mon);

Step 4: The percentage of turning back and diversion in each month of a certain year or certain years is calculated:

value_per(mon)=value_fhbj(mon)/[value_$tt$(mon)+ 0.000000001],mon=1,2,3,4,5,6,7,8,9,10,11,12

According to one embodiment of the present invention, the statistics of month distribution of turning back and diversion of a certain arrival airport can comprise the following steps:

Step 1: Setting an arrival airport i, the year can be one year or consecutive years;

Step 2: When the value of month mon is 1,2,3,4,5,6,7,8,9, 10,11,12 respectively, according to fhbj(ap,mon,tim) the distribution of turning back and diversion on the three dimensions-arrival airport, month and time period, the number of turning back and diverting flights of the arrival airport i in each month is calculated and recorded as: value_i_fhbj(mon);

Step 3: When the value of month mon is 1,2,3,4,5,6,7,8,9, 10,11,12 respectively, according to tt(ap,mon,tim) the distribution of flights on the three dimensions-arrival airport, month and time period, the number of flights of the arrival airport i in each month is calculated and recorded as value_i_tt(mon);

Step 4: The percentage of turning back and diversion of the arrival airport yin each month of a certain year or certain years is calculated, and the formula is:

value_$i$_per(mon)=value_$i$_$fhbj$(mon)/[value_$i$_$tt$ (mon)+0.00000001]

wherein mon=1,2,3,4,5,6,7,8,9,10,11,12

Searching module 802 is an important component of the prediction unit. According to one embodiment of the present invention, the searching module traverses the entire data space according to the data in the database and the requirements of the model and outputs the traversal results to the constraint solving module 803. Constraint solving module 803 judges whether the traversal results meet the constraint conditions and outputs the traversal results which meet the constraint conditions to the storing and ranking module 804. The storing and ranking module 804 stores all traversal results which meet the constraint conditions and ranks the traversal results. And then, high percentage region of abnormal flying time are output according to the results ranked.

According to one embodiment of the present invention, searching module 802 generates a region Z in the data space where the ratio of abnormal flying behaviors exceeds a threshold and then traverses the region Z.

The "module" mentioned therein can be a circuit that performs certain function. Therefore, the term "module" can also be replaced by "circuit". According to one embodiment of the present invention, these circuits comprise but are not limited to processor, digital signal processor (DSP), general microprocessor, application specific integrated circuit (ASIC), field programmable gate array (FPGA) or other equivalent integrated circuits or discrete logic circuits.

Figure 9:
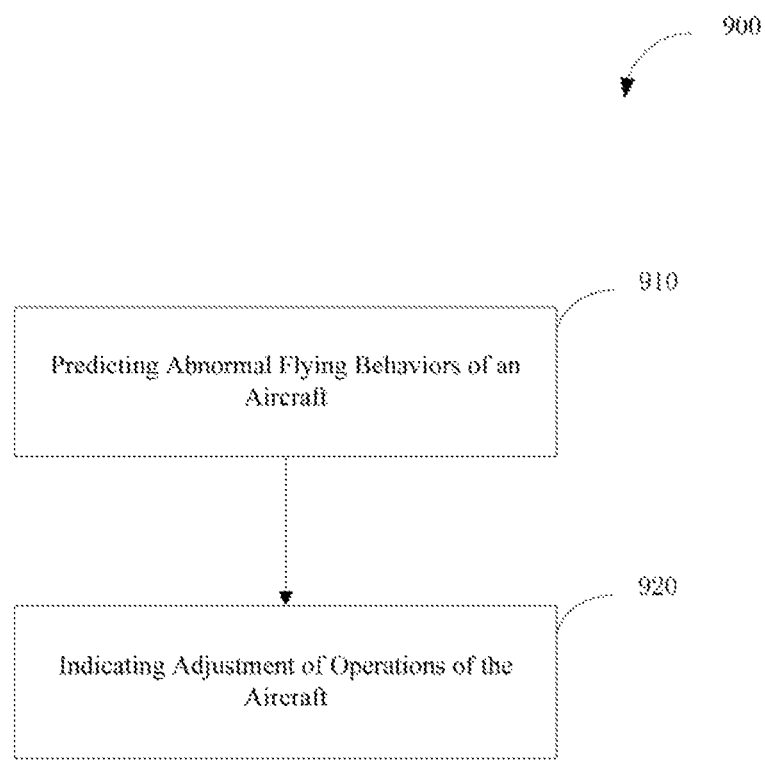
FIG. 9 is a flow chart illustrating the method for improving the flight safety according to one embodiment of the present invention.

FIG. 9 is a flowchart illustrating the method for improving the flight safety according to one embodiment of the present invention. The method as shown in FIG. 9 can be applied to the embodiments as shown in FIG. 7 and FIG. 8. In the embodiment of FIG. 9, the abnormal flying behavior of an aircraft is turning back and diversion, and the data space is a two-dimensional plane formed by time period and month.

As shown in FIG. 9, the method for improving the flight safety comprises step 910 of predicting abnormal flying behaviors of an aircraft; and step 920 of indicating adjustment of operations of the aircraft such that the possibility of abnormal flying behaviors is reduced.

Figure 10:
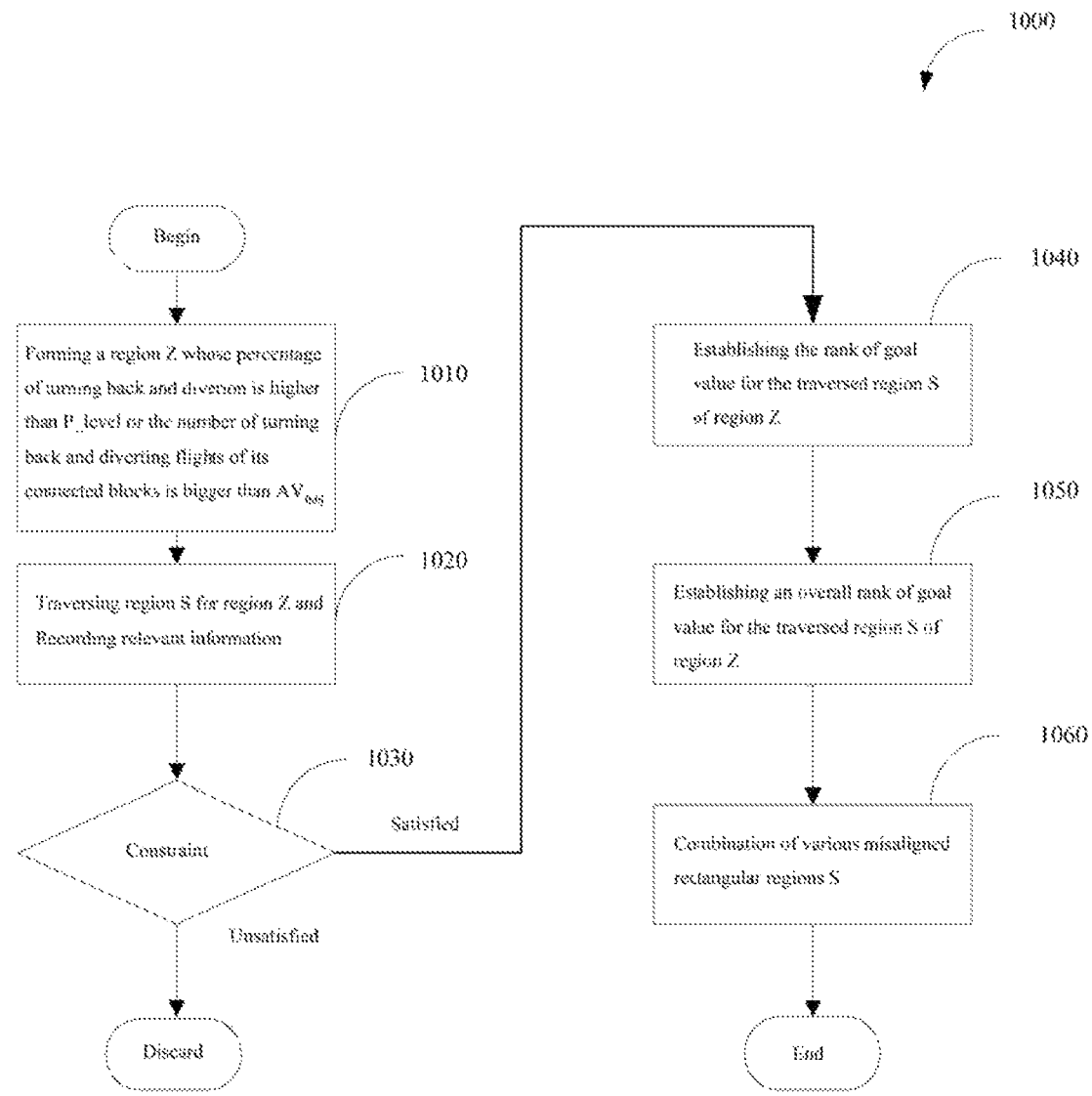
FIG. 10 is a flow chart illustrating the method for predicting behaviors of an aircraft according to one embodiment of the present invention.

FIG. 10 is a flowchart illustrating the method of predicting abnormal flying behaviors. As shown in FIG. 10, the method 1000 for predicting abnormal flying behaviors of an aircraft. In step 1010, a region Z is formed by using the searching module. Region Z comprises a multiple connected blocks. The percentage of turning back and diversion in region Z is higher than p_level, or the number of turning back and diverting flights in this block is bigger or equals to $av_{fhbj}$, wherein p_level is a preset threshold for the percentage of turning back and diversion or the average percentage of turning back and diversion, wherein av is a preset threshold for the number of turning back and diverting flights or the average amount of turning back and diverting flights.

The search of region Z in step 1010 is described below with reference to a specific embodiment.

According to one embodiment of the present invention, the blocks whose percentage of turning back and diversion is higher than p_level are searched and those connected blocks are marked by k; the information of the blocks is recorded by the struct keypoint, including the month, time period and the mark k.

Input: p(i, mon, tim), p_level, $av_{phbj}$ wherein p(i, mon, tim) is the percentage of turning back and diversion of all blocks, wherein i is the mark of an airport.

Output: struct keypoint (attributes: arrival airport (.ap), month (.mon), time period (.tim), region mark (mark)), and the number of region Z num_keyzoon 1010.1. Initialization step: mon=1, tim=1, m=1, n=1,k=1

1010.2. Search the blocks where the percentage of turning back and diversion is higher than p_level or the number of turning back and diverting flights is not less than $av_{phbj}$ and mark the blocks by k. More specifically, it comprises: searching the first combination of mon,tim where p(i, mon, tim) >p_level or the number of turning back and diverting flights is not less than $av_{fhbj}$, which is recorded by struct array keypoint, namely:

keypoint(n).mon=mon,keypoint(n).tim=tim,keypoint(n) .mark=mark=k, and let $p(i,\text{mon,tim})=0, m=n, n=n+1$ 1010.3. Search the block which connects keypoint(m) and whose percentage of turning back and diversion is higher than p_level or whose number of turning back and diverting flights is not less than $av_{fhbj}$, and mark the block by k.

A. mon=keypoint(m).mon+1, tim=keypoint(m).tim, when mon≤12 and p(i, mon, tim)>$p_{level}$ or the number of turning back and diverting flights in the block is not less than $av_{fhbj}$, it is recoded by the struct array keypoint, mon=keypoint(m).mon+1, tim=keypoint(m).tim,keypoint (n).mark=k, and let p(i, mon, tim)=0, n=n+1, otherwise, go to the next step.

B. mon=keypoint(m).mon−1, tim=keypoint(m).tim, when mon>0 and p(i, mon, tim)>n, level or the number of turning back and diverting flights in the block is not less than $av_{phbj}$, it is recorded by the struct array keypoint, mon=keypoint(m).mon−1, tim=keypoint(m).tim, keypoint(n).mark=k, and let p(i, mon, tim)=0, n=n+1, otherwise, go to the next step.

C. mon=keypoint(m).mon,tim=keypoint(m).tim+1, when tim≤23 and p(i, mon, tim)>n, level or the number of turning back and diverting flights in the block is not less than av,it is recorded by the struct array keypoint, mon=keypoint(m).mon,tim=keypoint(m).tim+1, keypoint (n).mark=k, and let p(i, mon, tim)=0, n=n+1, otherwise, go to the next step.

D. mon=keypoint(m).mon,tim=keypoint(m).tim−1, when tim>0 and p(i, mon, tim)>$p_{level}$ or the number of turning back and diverting flights in the block is not less than $av_{fhbj}$, it is recorded by the struct array keypoint, mon=keypoint(m).mon,tim=keypoint(m).tim−1, keypoint (n).mark=k, and let p(i,mon,tim)=0, n=n+1, otherwise, go to the next step.

1010.4. When m<n, m=m+1, repeat 1010.3, otherwise, go to the next step.

1010.5. When mon≤12 and tim≤23, turn to 1010.2, k=k+1, otherwise come to an end.

According to one embodiment of the present invention, all regions formed by blocks of struct keypoint are searched and recorded by the struct keyzoon. To be specific:

Input: struct keypoint, the number of region Z num_keyzoon, array fhbj(i, mon, tim), tt(i, mon, tim), wherein Output: struct keyzo on (attributes: arrival airport (.ap), starting month (.sm), ending month (.em), starting time period (.st), ending time period (.et), number of turning back and diverting flights (.flzbj), total number of flights (.tt))

1010.6. mark=1;

1010.7. The minimum value and maximum value of the attribute mon of all blocks which equal to mark are recorded as sm, em; and the minimum value and maximum value of the attribute tim of all blocks which equal to mark are recorded as st, et.

1010.8. The region is recorded by struct keyzoon, namely:

keyzool(mark)sm=sm,keyzoom(mark).em=em,keyzoon (mark).st=st,keyzoon(mark).st=st.keyzoon(mark).et=et and, the number of turning back and diverting flights in the region is recorded by using the attribute value_jhbj; the number of flights in the region is recorded by using the attribute value_tt; the area of the region is recorded by using the attribute num_z, mark=mark+1.

1010.9. When mark 1, go to step 1010.7.

And then, calculate constraint conditions $av_n, av_{fhbj}$, which can be performed in any steps before the constraint step 1030. To be specifically:

Input: fhbj(i,mon,tim),tt(i,mon,tim)

Output: $av_n, av_{fhbj}$ 1010.10. $value_{fhbj}=0$, $value_n=0$, mon=1, tim=1

1010.11. If tt(i,mon,tim)>0, $value_{tt}=value_{tt}+tt(i,mon,tim)$ 1010.12. If fhbj(i,mon,tim)>0,$value_{fhbj}=value_{fhbj}+fhbj(i,mon,tim)$ 1010.13. If tim=tim+1 and tim<24, return to step 1010.11, otherwise tim=1, go to 1010.14

1010.14. If mon=mon+1 and mon<13, return to step 1010.11

1010.15. $av_{fhbj}=value_{fhbj}/$number blocks having turning back and diverting flights $av_n=value_{tt}/$number of blocks having flights Through step 1010, a region Z marked by struct keyzoon is obtained. The struct comprises a multiple records with each corresponding to a region where the percentage of turning back and diversion is higher than p_level, or the number of turning back and diverting flights in the block is more than or equals to $av_{fhbj}$.

In step 1020, the region Z obtained in step 1010 is traversed by using the searching module.

The struct keyzoon,index,P1, P2, P3 are input, wherein index is the serial number of region Z. And then, the number index region Z is traversed and each traversal of region S is recorded by struct list1: recording the starting month, ending month, starting time period, ending time period, number of turning back and diverting flights, total number of flights and area of region S by using the attributes min_m, max_ at, min_t, max_t, value_fhbj, value_tt and num_s respectively.

In step 1030, each traversal result is judged as to whether it meets the constraint conditions and each traversal result which meets the constraint conditions is recorded by using the struct List. To be specifically:

1030.1. Three optimal goal values of the traversal results of each region are solved, the single goal values are ranked, and then the three goal values of each traversal is averaged. The smallest value of the traversal is selected the optimal value of the region.

1030.2. Judge the record of list) according to the constraint condition. The records which meet the one of the following two conditions are recorded by using the struct list.

The constraint conditions for judgment are:

$$value_{fhbj} \geq num_S * av_{fhbj}, value_{tt} \geq num_S * av_{tt}.$$

1030.3. Calculate the first objective function value of all the regions traversed and record it as goal1.

1030.4. Calculate the second objective function value of all the regions traversed and record it as goal2.

1030.5. Calculate the third objective function value of all the regions traversed and record it as goal3.

1030.6. Rank all the regions traversed according to the value of the three goals, the biggest one recorded as 1, the next recorded as 2, each recorded by using the attributes $goal1_{index}$, $goal2_{index}$, $goal3_{index}$ of the struct list respectively.

In step 1050, the overall rank is calculated. Specifically, it comprises: and calculate the overall rank of the three goals of each traversal and record the above by using the attribute goal_total of the $struct^{list}$. The formula for calculating the overall rank of number irecord of the struct listis:

$$list(i).goal_{total}=P1*list(i).goal1_{index}+P2*list(i).goal2_{index}+P3*list(i).goal3_{index}$$

In step 1060, search the traversed region with the smallest attribute $goal_{total}$ in the struct list and return to the starting month sm, ending month em, starting time period st and ending time period et.

Through the above steps, the high percentage region S(sm, em,st,et) of the number index region Z is output finally.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The above embodiments of the invention have been disclosed only for illustrative purposes and are not to limit the present invention. Those skilled in the art can achieve various modifications and transformations without exceeding the scope of the present invention. Therefore, all equivalent technical solutions should fall within the scope disclosed by the present invention.

We claim:

1. A system for improving the flight safety, comprising:
a prediction module comprising circuitry configured to predict behaviors of an aircraft, the prediction module further comprises:
   a model generation unit comprising circuitry configured to construct a data space based on two or more data dimensions of flying behaviors and generates a prediction model of flying behaviors according to searching conditions and constraint conditions,
   a data acquisition unit comprising circuitry configured to acquire data of flying behaviors, and
   a prediction unit comprising circuitry configured to search high percentage regions of abnormal flying behaviors on the data space by using the prediction model of flying behaviors according to the data of flying behaviors; and
an indication module comprising circuitry configured to indicate an adjustment of an operation of the aircraft to reduce the possibility of occurrence of abnormal flying behaviors,
   wherein the search of the prediction unit is performed in the region ready for search which is included in the data space,
   wherein the searching conditions of the model generation unit maximize the percentage of abnormal flying behaviors of the high percentage region, the area of the high percentage region is by approaching the entire region ready for search, and the number of flights having abnormal behaviors contained in the high percentage region, and
   wherein the constraint condition of the model generation unit includes at least one of the number of flights having abnormal behaviors and total number of flights in the high percentage region exceeds a preset threshold.

2. The system according to claim 1 further comprises a database, wherein the prediction unit acquires data of flying behaviors from the data acquisition unit or the database.

3. The system according to claim 1, wherein the constraint condition of the model generation unit further comprises: the percentage of abnormal flying behaviors in the high percentage region exceeds another threshold.

4. The system according to claim 1, wherein the data acquisition unit determines the data of the data dimensions through adjustment by using the raw data of flying behaviors.

5. The system according to claim 1, wherein the prediction unit further comprises:
   searching module, traversing the region ready for search;
   constraint solving module, judging whether the traversal results meet the constraint conditions; and
   storing and ranking module, storing all traversal results which meet the conditions, and ranking on an overall basis, and outputting high percentage regions of abnormal flying time according to the overall ranking result.

6. The system according to claim 5, wherein the searching unit searches the region ready for search on the entire data space.

7. The system according to claim 6, wherein the searching unit searches the block whose percentage of abnormal flying behaviors exceeds the first threshold, and marks the connected blocks.

8. The system according to claim 7, wherein the searching unit further searches the region formed by blocks whose percentage of abnormal flying behaviors exceeds the first threshold.

9. The system according to claim 8, wherein the constraint solving module solves the searching conditions for the traversal results of each region, ranks single goal value and selects the minimum value as the optimal value of the region.

10. The system according to claim 9, wherein the constraint solving module judges the traversal with minimum value according to the constraint conditions.

11. The system according to claim 10, wherein the constraint solving module judges the traversal with minimum value according to the constraint conditions.

12. The system according to claim 5, wherein the storing and ranking module calculates and ranks the value of each searching condition for all regions traversed.

13. The system according to claim 12, wherein the storing and ranking module calculates the overall rank of all traversed blocks according to the value of each searching condition of all regions traversed.

14. A method of improving of the flight safety, comprising:
predicting behaviors of an aircraft, comprising:
   constructing a data space based on two or more data dimensions of flying behaviors and generating a prediction model of flying behaviors according to searching conditions and constraint conditions,
   acquiring data of flying behaviors, and
   searching high percentage regions of abnormal flying behaviors on the data space by using the prediction model of flying behaviors according to the data of flying behaviors; and
indicating adjustment of an operation of the aircraft to reduce possibility of occurrence of abnormal flying behaviors;
   wherein the searching is performed in the region ready for search that is a part of the data space,
   wherein the searching conditions maximize the percentage of abnormal flying behaviors in the high percentage region, the area of the high percentage region is by approaching the entire region ready for search, and the number of flights having abnormal flying behaviors contained in the high percentage region, and
   wherein the constraint condition includes at least one of the number of flights having abnormal behaviors and the total number of flights in the high percentage region exceeds a preset threshold.

15. The method according to claim 14, wherein the constraint condition further comprises: the percentage of abnormal flying behaviors in the high percentage region exceeds another threshold.

16. The method according to claim 14, further comprises determining the data of the data dimensions through adjustment by using the raw data of flying behaviors.

17. The method according to claim 14, further comprises:
   traversing the region ready for search;
   judging whether the traversal results meet the constraint condition; and
   storing all traversal results which meet the conditions and ranking on an overall basis;
and then outputting high percentage regions with abnormal flying time according to the overall ranking results.

18. The method according to claim 17, further comprises searching the region ready for search in the entire data space.

19. The method according to claim 18, further comprises searching the block whose percentage of abnormal flying behaviors exceeds the first threshold and marking the connected blocks.

20. The method according to claim 19, further comprises searching the region formed by blocks whose percentage of abnormal flying behaviors exceeds the first threshold.

21. The method according to claim 20, further comprises solving the searching condition for the traversal results of each region, ranking single goal value, and selecting the traversal with minimum value as the optimal value of the region.

22. The method according to claim 21, further comprises judging the traversal with minimum value according to the constraint conditions.

23. The method according to claim 17, further comprises calculating and ranking the value of each searching condition of all regions traversed.

24. The method according to claim 23, further comprises calculating the overall rank of all the blocks traversed according to the value of each searching condition of all regions traversed.

\* \* \* \* \*